Dec. 12, 1961 G. S. NALLE, JR 3,012,275
MULTIPLE PLUG DIE MACHINE FOR EXTRUDING PLASTIC NETTINGS
Filed Oct. 31, 1960 5 Sheets-Sheet 1
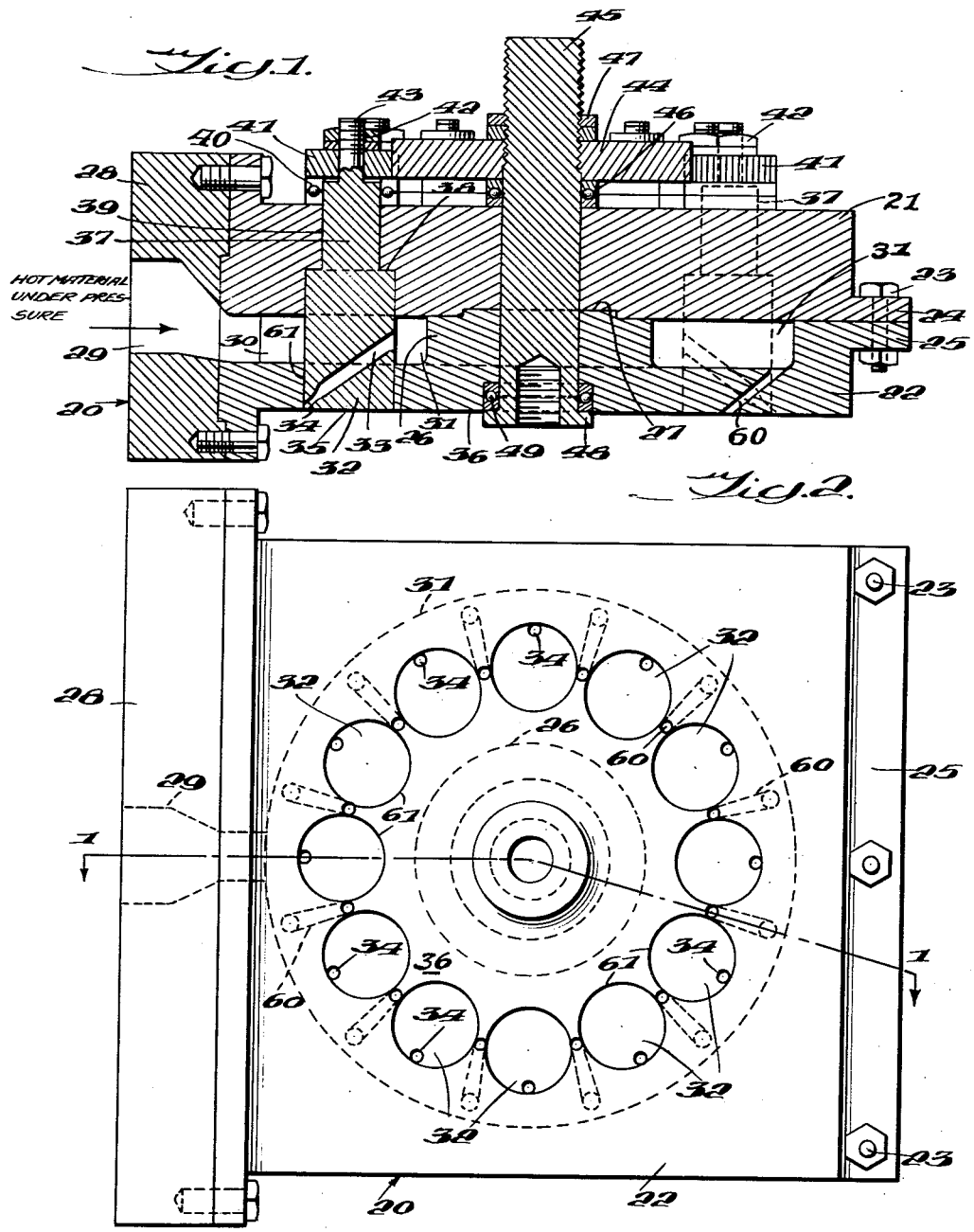
INVENTOR.
GEORGE S. NALLE, JR.
BY
ATTORNEY Dec. 12, 1961  G. S. NALLE, JR  3,012,275
MULTIPLE PLUG DIE MACHINE FOR EXTRUDING PLASTIC NETTINGS
Filed Oct. 31, 1960  5 Sheets-Sheet 2
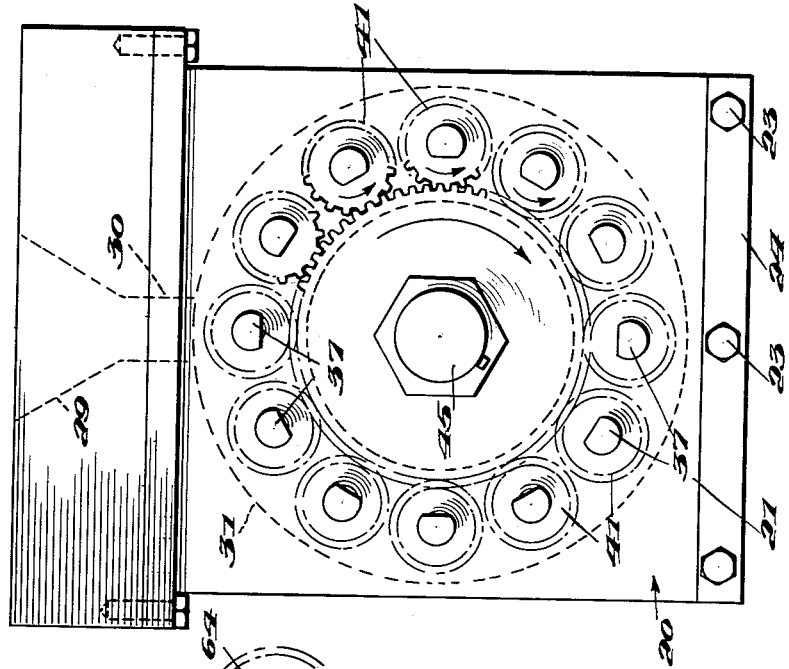
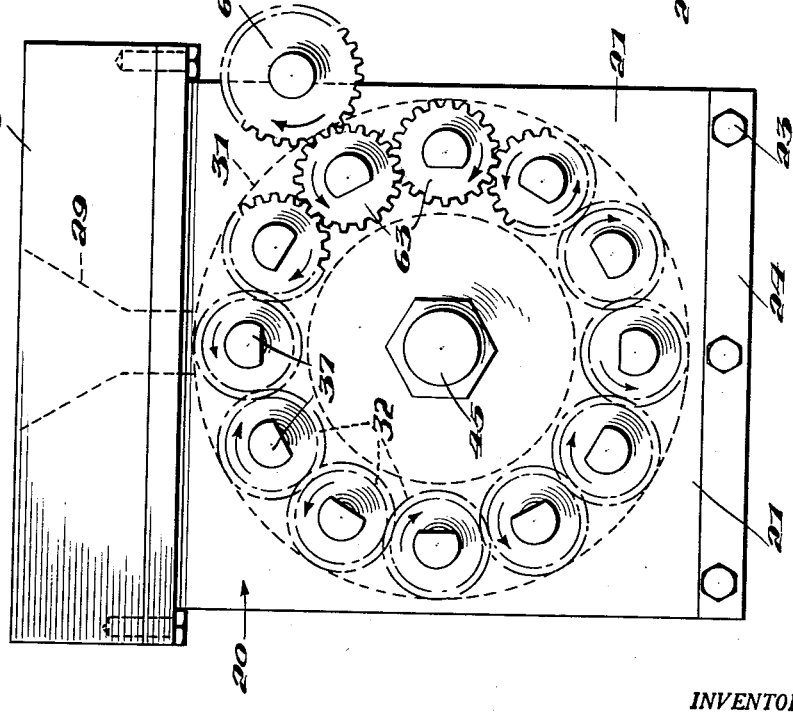
INVENTOR.
GEORGE S. NALLE, JR.
BY
*Philip E. Siggers*
ATTORNEY

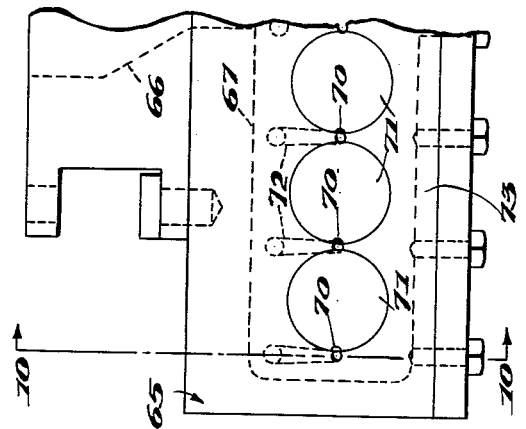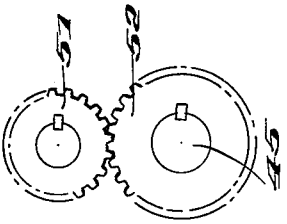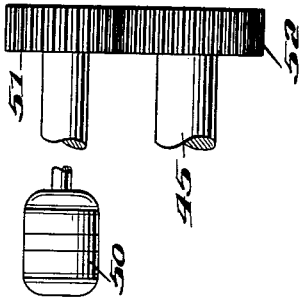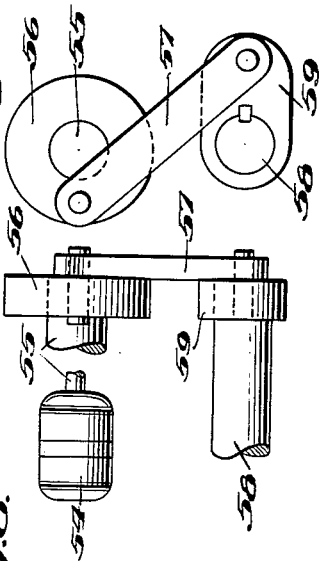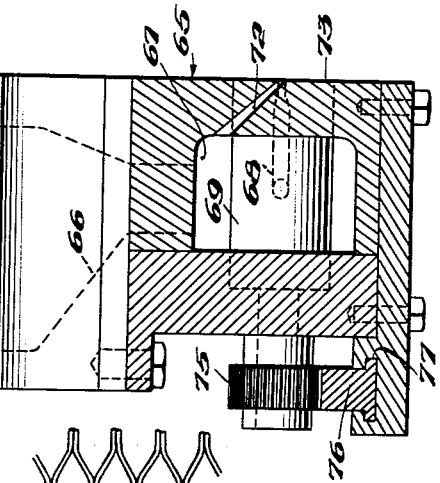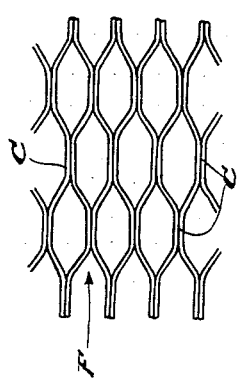
INVENTOR.
GEORGE S. NALLE, JR,
BY Dec. 12, 1961  G. S. NALLE, JR  3,012,275
MULTIPLE PLUG DIE MACHINE FOR EXTRUDING PLASTIC NETTINGS
Filed Oct. 31, 1960  5 Sheets-Sheet 4
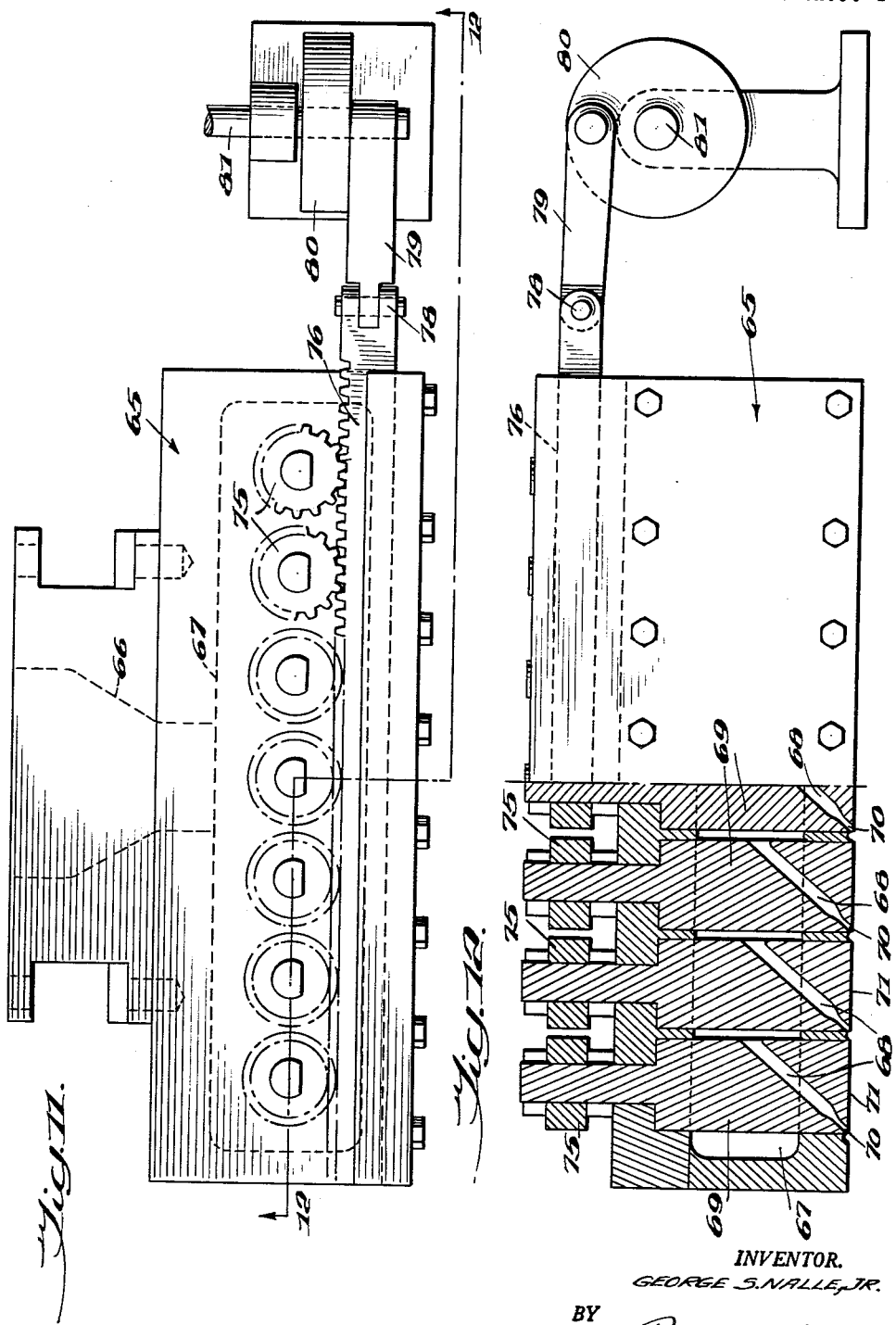
INVENTOR.
GEORGE S. NALLE, JR.
BY
ATTORNEY Dec. 12, 1961  G. S. NALLE, JR  3,012,275
MULTIPLE PLUG DIE MACHINE FOR EXTRUDING PLASTIC NETTINGS
Filed Oct. 31, 1960  5 Sheets-Sheet 5

INVENTOR.
GEORGE S. NALLE, JR.
BY
*Philip E. Diggs*
ATTORNEY

United States Patent Office 3,012,275
Patented Dec. 12, 1961

3,012,275
MULTIPLE PLUG DIE MACHINE FOR EXTRUDING PLASTIC NETTINGS
George S. Nalle, Jr., 108 W. 2nd St., Austin, Tex.
Filed Oct. 31, 1960, Ser. No. 66,189
14 Claims. (Cl. 18—12)

This invention relates to machines for automatically extruding continuous or running lengths of plastic nettings. By the term "plastic" I mean not only resinous plastics such as polystyrene, but also plastic metal alloys.

The general object of the invention is to provide a machine which will extrude a plastic netting as a unitary structure which is complete except for hardening and cutting to size. Another object is to provide a machine of the character indicated which may extrude either a continuous tubular netting or a continuous flat netting, both types of nettings being formed without protuberances. A more specific object is to provide a netting extruding machine which is so made and operated that the netting strands are coalesced along substantial lengths to make the unions or junctures, but do not cross or intersect. These coalesced lengths are variable by the operator and if long may form a fringe for the netting structure when the lengths are severed. Other objects will become apparent from the following description of several embodiments of the invention and one of the products thereof.

Machines of the invention will produce either very coarse, tough and strong nettings or fine light nettings, as preferred. The nettings may reinforce various textile fabrics, articles of clothing, house furnishings, etc., may be used alone as ornamental hangings, coverings or draperies, and may be used in many fields where textile nettings are used.

In the accompanying drawings forming a part of this specification,

FIG. 1 is a vertical section through a die head embodying the invention, being a cross section on line 1—1 of FIG. 2; the operating mechanism for the multiple plug dies being omitted;

FIG. 2 is a bottom plan view of the die head of FIG. 1;

FIG. 3 is a top plan view of the diehead of FIG. 1, showing a center drive gear arrangement for operating the multiple plug dies;

FIG. 4 is a top plan view of the same die head but having a modified gearing for driving the multiple plug dies;

FIG. 5 is a top plan view of a gear drive for the central shaft of FIGS. 1 and 3 or for the offset drive gear of FIG. 4;

FIG. 6 is a side elevation of the gear drive of FIG. 5, with a motor (reduced in size) aligned with one of the gears to symbolize an electric motor drive;

FIG. 7 is a top plan view of a simple eccentric drive for oscillating the central drive shaft of the machine of FIGS. 1 and 3, or the offset drive shaft of the machine of FIG. 4;

FIG. 8 is a side elevation of the eccentric drive of FIG. 7, showing a motor, reduced in size, to symbolize an electric motor drive;

FIG. 9 is a fragmentary bottom plan view of a modified die head which is like the die head of FIGS. 1, 2 and 3 except that the die plugs are arranged in a straight line to form a flat netting continuously;

FIG. 10 is a cross section on line 10—10 of FIG. 9; the bottom of the die head being at the right side of the figure;

FIG. 11 is a top plan view of the straight line die head of FIG. 9, showing in full and dotted lines a rack and pinion drive for oscillating the die plugs;

FIG. 12 is a section on line 12—12 of FIG. 11;

FIG. 16 is a fragmentary plan view of one of the nettings which may be made by a die head embodying the invention.

Figure 13:
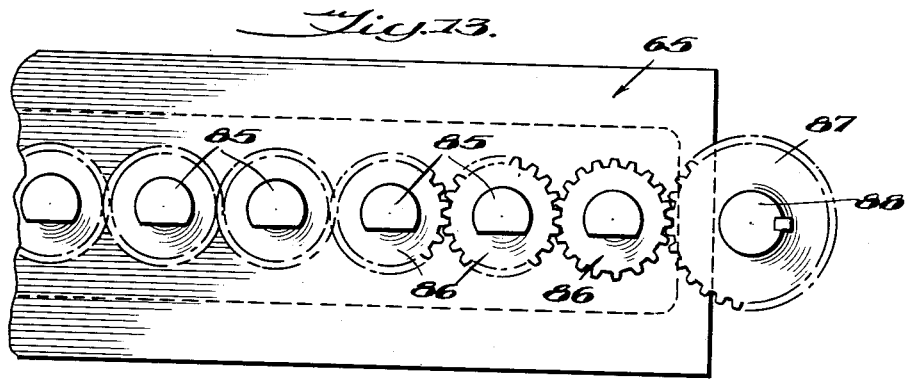
FIG. 13 is a fragmentary top plan view of a gear train drive for rotating the die plugs of the die head of FIGS. 9–12.

Referring particularly to the drawings, and first to FIGS. 1, 2 and 3, a die head 20 is shown as being of two massive metal blocks 21, 22 secured together and sealed by bolts 23 passing through abutted flanges 24, 25. The lower block 22 has an upstanding circular boss 26 which supports the upper block 21 and centers it by entering the circular recess 27 milled in the lower face of the upper block. The die head 20 is rigidly secured to the discharge end of a container 28 (only a small portion of which is shown) holding a supply of a heated plastic material (not illustrated) which during operations will be under considerable pressure from an extruder screw or equivalent pressurizing mechanism (not shown). The outlet 29 of the plastics container 28 discharges the material into a port 30, and from the inlet port 30 the material flows under pressure into an annular channel 31 surrounding the boss 26, the material filling said channel.

Rotatably mounted in the annular channel 31 are a series of vertically disposed die plugs 32 arranged in a circle. The drawings for convenience illustrate only twelve of these plugs but there may be up to one hundred or more. Obviously when a large number of die plugs are provided, there must be a sufficient number of inlets for the plastics material to insure that each die plug receives its quota of such material. The die plugs 32 are preferably brass or bronze cylinders having transverse downwardly inclined extrusion bores 33 which preferably are considerably reduced at their discharge ends 34. The upper end of each of the bores 33 is open to the annular channel 31 and thus receives plastics material from it. The reduced discharge ends 34 of the bores terminate at the intersection of the plane lower ends 35 of the plugs with the cylindrical side walls thereof. The plane lower ends 35 are also level with the bottom surface 36 of the lower die block 22. The die plugs 32 are reduced in diameter at their upper ends 37 providing annular shoulders 38 which bear against the upper ends of the counterbores 39 in the upper die block 21. Thus upward movement of the die plugs responsive to the reaction of the pressurized plastics material is obviated. The die plugs are rotatably supported by thrust bearings 40 (shown diagrammatically) under pinions 41 keyed or otherwise fixed to the upper ends 37 of the die plugs. A nut and washer set 42 or a lock nut (not shown), screwed on the reduced threaded upper end 43 of each die plug, secures each pinion 41 as well as the die plug.

Each pinion 41 meshes with a spur gear 44 (FIGS. 1 and 3) threaded on a central shaft 45 and supported by a thrust bearing 46 (shown diagrammatically) on top of die block 21. Nuts 47 secure the spur gear 44 on its shaft. At its upper end, shaft 45 is screw-threaded for the securing nuts 47. The lower end of shaft 45 has a flange 48 and a thrust bearing 49 (shown diagrammatically) is interposed between flange 48 and the lower die block 22. Shaft 45 is adapted to be driven by any one of several mechanims, two of which will now be described.

Referring to FIGS. 5 and 6, an electric motor 50 (shown very small for convenience of illustration) drives a pinion 51 preferably through a reduction gear unit (not illustrated), and pinion 51 meshes with a spur gear 52 which is keyed to shaft 45. This arrangement drives gear 44, which rotates the pinions 41 to turn the die plugs slowly on their longitudinal axes.

Referring to FIGS. 7 and 8, motor 54 (shown very small for convenience of illustration) drives shaft 55 through a reduction gear unit (not illustrated), and shaft 55 rotates crank disk 56 to which a connecting rod 57 is pivotally connected. Connecting rod 57 oscillates shaft 58 through a crank 59. Shaft 58 is the drive shaft for the machine, effecting oscillation of the set of die plugs about their axes through 180°.

Referring to FIG. 2, between each pair of die plugs is a tapering extrusion passage 60 drilled in the lower die block 22. See also the right hand side of FIG. 1. The upper end of each passage 60 is open to the annular channel 31 while the lower or dicharge end of each extrusion passage 60 is nearly tangential to the two adjacent circular bores 61 which serve as bearings for the rotating or oscillating die plugs. By the expression "nearly tangential" I mean that the extrusion passages 60 are actually open at their lower ends to the bores 61 on each side. The diameter of the extrusion passages 60 is exaggerated in the drawings for clearness of illustration; in an actual installation these passages may be smaller than 0.5 mm. in diameter, and the discharge ends 34 of bores 33 may be of similarly small dimensions.

When the machine of FIGS. 1, 2 and 3 is in operation, the die plugs 32 constantly rotate in the same direction at the same slow speed, extruding the plastic material through bores 33. Once in each revolution of each die plug, the material extruded, under the pressure imparted to it, will contact and fuse or coalesce with the plastic material issuing from an extrusion passage 60; this fusing occurs twice is each revolution, as the passages 60 are on each side of each die plug, or 180° apart, see FIG. 2. The fusing is not a crossing or intersecting but rather a longitudinal coalescing, the united filaments running alongside each other and then separating. See FIG. 16 for a detail plan view of the fabric F so formed: note the areas of fusion or coalescence indicated at C. The fabric extruded by the machine of FIGS. 1, 2 and 3 will necessarily be a continuous tubular netting as the die plugs 32 and the extrusion openings 60 are arranged in cooperating circular series.

Now referring to FIG. 4, the parts are exactly the same except the gear drive for simultaneously rotating the die plugs is different. In this modification, each die plug 32 is rotated by a gear 63 which meshes with two like gears 63 on each side. A power-driven gear 64 meshes with one of the gears 63 and hence rotates the entire set of die plugs 62 at the same slow speed, but with this difference: the direction of rotation of each die plug is opposite to the direction of rotation of the die plugs on either side. Any suitable mechanism may be used to control the speed of rotation. The more rapid the rotation, the smaller the meshes of the extruded fabric.

Referring to FIGS. 9, 10, 11 and 12, I have shown apparatus for extruding a flat netted fabric of the type illustrated in FIG. 16. An elongated die head 65 receives the heated plastics material through a throat 66. The plastics material flows into a channel 67 extending for nearly the entire length of the die head. From channel 67 the plastic material flows into the extrusion bores 68 of die plugs 69. For convenience of illustration only seven die plugs are illustrated, but there may be many scores of such plugs. The lower or discharge ends 70 of bores 68 are constricted and may be much smaller than is illustrated: as fine as 0.5 mm. or even finer. The die plugs 69 are mounted in the die head so as to oscillate on their longitudinal axes. Each die plug is a metal cylinder with the bore 68 extending from its cylindrical surface downwardly and transversely to the point where the outer end surface 71 meets the cylindrical surface. See FIG. 12. As best shown in FIG. 10, the die head has a plurality of tapering extrusion passages 72 drilled in it and extending from the bottom of channel 67 to the bottom surface 73 of the die head. The discharge ends of passages 72 may be of a fineness equal to that of the discharge ends 70. The passages 72 end on both sides of each die plug, as FIG. 9 indicates; thus there is one more extrusion passage 72 than the total number of die plugs, so that the material extruded from each discharge end 70 contacts the material extruded from passages 72 on diametrically opposite sides, as the plug oscillates on its longitudinal axis.

To operate the die plugs 69, the upper ends of said die plugs may carry pinions 75 and a reciprocatory rack 76 may mesh with the pinions 75 as shown in FIGS. 10 and 11, the rack being guided and supported in a T-slot 77. At one end the rack 76 has a pivotal connection 78 with a crank 79 which in turn is pivotally connected with a crank disk 80 keyed to a power-driven shaft 81. The stroke of the rack 76 is governed so that the die plugs 69 oscillate through such angles as will bring the extrusion openings 70 into adjacency with the passages 72. It will be understood that the illustrated drive 75, 76, etc. is essentially diagrammatic and that other drives, for example, cam drives, may be used, or I may use the gear train illustrated in FIG. 13. Here the die head 65 carries a set of die plugs whose upper ends 85 carry pinions 86 forming a gear train. A drive gear 87 on a power shaft 88 operates the gear train. In this case the die plugs are continuously rotated, each in a direction opposite to the direction of rotation of the adjacent die plug.

Figure 14:
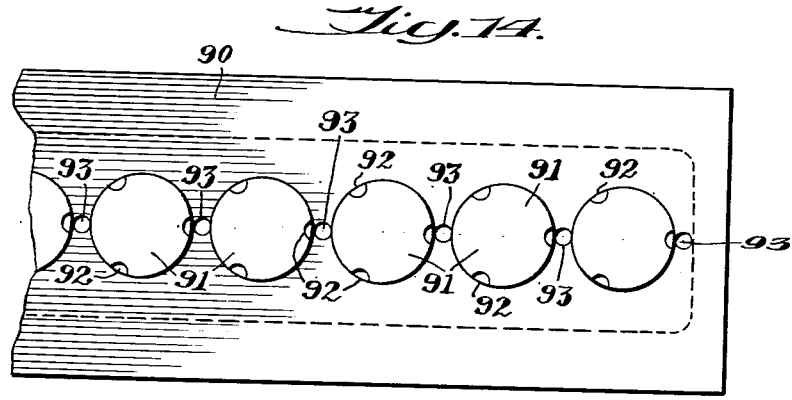
FIG. 14 is a bottom plan view of the straight line die heads of FIGS. 9–12 but with a different arrangement of extrusion orifices.

FIG. 14 shows an arrangement of a die head 90 wherein the die plugs 91 are arranged in a straight row, and each die plug has three discharge openings 92 spaced 120° apart. These traveling openings register with the two stationary extrusion openings 93 provided in the die head on diametrically opposite sides of each die plug. This arrangement will provide a netting structure having more meshes per linear foot of length than is possible with the machine of FIGS. 9–12. Obviously there may be three or more stationary extrusion orifices for each die plug, instead of the two indicated at 93. When there is an increase in the number of extrusion orifices, special provision must be made to insure even feeding of the pressurized plastics material to all the orifices. The die head of FIG. 14 may obviously be modified to put all the die plugs in a circle, as in FIGS. 1, 2 and 3, to form a tubular netting.

Figure 15:
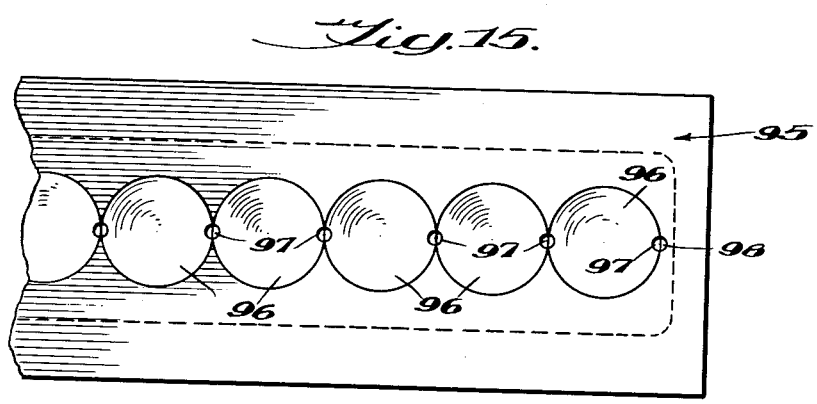
FIG. 15 is a bottom plan view of the straight line die head of FIGS. 9–12 modified so that the die plugs are tangential to each other, with their extrusion orifices 180° apart.

In FIG. 15 I have shown a die head 95 having a set of tangential die plugs 96 each having a pair of extrusion orifices 97 at opposite sides, 180° apart. If the die plugs are slowly rotated, the welds will be short but long enough to make a useful netting. If longer welds as at C, FIG. 16, are desired, the die plugs 96 should be oscillated through 180°, with a dwell at the end of each movement in either direction. In this form there are no stationary extrusion openings beween the die plugs, but at the opposite ends of the straight row of die plugs the die head 95 has extrusion passages 98, only one being shown in FIG. 15. To insure the proper strength in the die head, the tangential die plugs 96 have a pronounced taper, not shown. The arrangement of FIG. 15 may be modified to put all of the die plugs in a circle to form a tubular netting. This will be obvious after referring to FIGS. 1, 2 and 3. Also the tangential plugs 96 may have three or more extrusion orifices, equally spaced apart.

Other variations and modifications will be obvious to those skilled in the art. I do not wish to be limited by the above description but only as required by the subjoined claims, which fairly define the invention.

I claim:

1. Apparatus for extruding a continuous unitary netting of plastics material comprising, in combination, a source of pressurized plastics material; a hollow die head connected to said source to receive said plastics material; a plurality of die plugs mounted on bearing surfaces within the confines of the die head so as to be capable of angular turning on their longitudinal axes; each of said die plugs having a pair of extrusion bores, one end of each extrusion bore receiving the pressurized plastics material from the hollow die head, the other end of each extrusion bore terminating at the end of the die plug and at the outer surface of the die head; each of said die plugs being tangential to the one or two plugs adjacent thereto and the openings of all tangential plugs being open intermittently to each other as the plugs turn on their axes; and power means to turn the plugs simultaneously through the same angle about their respective axes.

2. The invention defined in claim 1, wherein the die plugs are arranged in a straight row and the die head has a pair of extrusion openings located at the opposite ends of the row and cooperating with the adjacent die plugs to form welds in the netting.

3. The invention claimed in claim 1, wherein the die plugs are arranged in a circular series.

4. Apparatus for extruding a continuous unitary netting of plastics material comprising, in combination, a source of pressurized plastics material; a hollow die head connected to said source to receive said plastics material; a plurality of die plugs mounted on bearing surfaces within the confines of the die head so as to be capable of angular turning on their longitudinal axes; each of said die plugs having a plurality of extrusion bores, one end of each extrusion bore receiving the pressurized plastics material from the hollow die head, the other end of each extrusion bore terminating at the end of the die plug and at the junction between the end surface and the side walls of the die plug; said other end of each die plug discharging outside of the die head; the die head having a plurality of stationary extrusion passages leading from the hollow interior thereof to the outer surface thereof and each of said stationary extrusion passages being intermittently tangential to the traveling extrusion bores of the die plugs; and power means to turn the die plugs simultaneously through the same angle about their respective axes.

5. The invention defined in claim 4, wherein there are at least three extrusion bores in each die plug, said bores being spaced equiangularly apart; there being one stationary extrusion passage between each pair of die plugs and being alternately tangential to the extrusion bores of the die plugs of that pair as the die plugs are turned on their axes.

6. The invention defined in claim 4, wherein the die plugs are arranged in a straight row and there is a stationary extrusion passage in the die head at each end of the row.

7. The invention defined in claim 4, wherein the die plugs are arranged in a circle to form a continuous tubular netting.

8. Apparatus for extruding a continuous integral netting of plastics material comprising, in combination, a source of pressurized plastics material; a hollow die head connected to said source to receive said plastics material; a plurality of die plugs of round cross section mounted on bearing surfaces within the confines of the die head so as to be capable of turning on their longitudinal axes; each of said die plugs having an extrusion bore, one end of said bore receiving the plastics material within the hollow die head, the other end of said bore terminating at the end of the die plug and at the junction between the end surface of said plug and the rounded side walls thereof, and said other end discharging to the exterior of the die head; the die head having a plurality of extrusion passages leading from the hollow interior thereof to the outer surface thereof and opening to the bearing surfaces provided for said die plugs; and power means to turn the die plugs on their axes sufficiently to bring the discharge openings of the extrusion bores immediately adjacent the ends of the stationary extrusion passages in the die head.

9. The invention defined in claim 8, wherein the power means includes a gear mechanism constructed and arranged to cause all the die plugs to rotate simultaneously at the same angular velocity in the same direction.

10. The invention defined in claim 8, wherein the power means includes a gear train, a gear being fixed to each die plug outside the die head, and all the gears meshing with adjacent gears on either side, the gears being of the same size so that all the die plugs rotate at the same angular velocity but adjacent die plugs rotate in opposite directions.

11. The invention defined in claim 8, wherein the power means includes a power-reciprocated rack, pinions being fixed to each of the die plugs outside the die head, said rack meshing with said pinions to turn the die plugs simultaneously in the same direction through the same angle.

12. The invention defined in claim 8, wherein the power means includes an electric motor and a mechanical drive actuated by the motor to oscillate the die plugs about their axes through an angle sufficient to bring the moving extrusion bores in the die plugs into registry with the stationary extrusion passages in the die head.

13. The invention defined in claim 8, wherein the die plugs are arranged in a circle, and the stationary extrusion passages have their discharge openings also arranged in a circle.

14. The invention defined in claim 8, wherein the die plugs are arranged in a straight line, and the stationary extrusion passages have their discharge openings also arranged in a straight line.

References Cited in the file of this patent

UNITED STATES PATENTS 2,919,467  Mercer _____ Jan. 5, 1960

FOREIGN PATENTS 555,251  Belgium _____ Nov. 14, 1956